R. KJUUS.
THREE-HORSE SWINGLETREE.
APPLICATION FILED MAR. 20, 1913.

1,112,625.

Patented Oct. 6, 1914.

Witnesses:

Inventor:
per Ragnar Kjuus
Attorney.

UNITED STATES PATENT OFFICE.

RAGNAR KJUUS, OF NES, NEAR AARNES, NORWAY.

THREE-HORSE SWINGLETREE.

1,112,625.  Specification of Letters Patent.  Patented Oct. 6, 1914.

Application filed March 20, 1913. Serial No. 755,652.

*To all whom it may concern:*

Be it known that I, RAGNAR KJUUS, a subject of the King of Norway, residing at Nes, near Aarnes, Norway, have invented certain new and useful Improvements in Three-Horse Swingletrees; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in the construction of three horse swingletrees of the kind often used on selfbinders and similar agricultural machinery.

Three horse swingletrees usually are arranged to swing on a vertical pin, one arm of the double lever thus formed being double the length of the other arm. An ordinary doubletree with two swingletrees is hinged to the shorter arm where two horses are pulling the third horse pulling at the end of the long arm.

To use a machine or vehicle provided with such three horse swingletree with two horses only, it is necessary to unhinge the three horse swingletree and fix the doubletree directly on the machine or the beam. This is the case with most selfbinders now on the market. Using a selfbinder with the known form of three horse swingletree involves the further disadvantage that the machine will tilt until it strikes the ground in front as soon as the horses are not pulling. This is due to the fact that the front part of the machine is carried by the two horses pulling at the doubletree keeping the tugs taut. As soon as the horses stop pulling the third horse will move back so far that the tugs for the two other horses get quite slack and the machine will tilt till it strikes the ground with its front part so that it must be lifted by the driver before it can be started again.

According to my present invention these disadvantages are avoided by providing a stop which prevents the tree from swinging more than a certain amount from the middle position.

When only two horses are used the three horse swingletree is engaged by the said stop and can not swing farther. Thus it is not necessary to unhinge and rearrange the parts when it is desired to drive with two horses instead of three.

Figure 1:
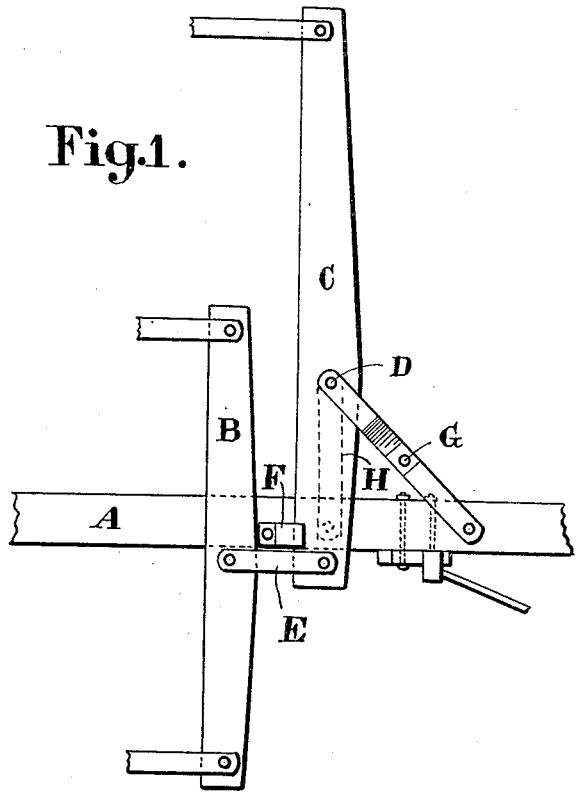
Figure 2:
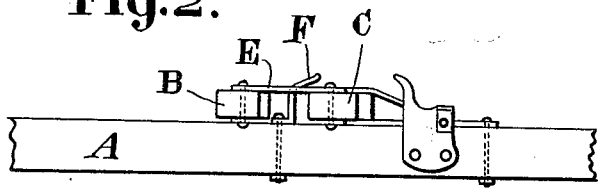

On the drawings: Figure 1 represents a plan of the arrangement and Fig. 2 a side view of same.

A is the beam, B the double tree and C the three horse swingletree. The latter is pivoted on a pin D carried by a support G, H. and the double tree is hinged to its shorter arm by means of link E.

F represents a stop which may be of any preferred construction and which is secured to the upper face of the beam A, just in rear of the doubletree B, between the latter and the swingletree. By this arrangement it will be noted that it is possible to utilize the machine with two horses without disconnecting the three-horse swingletree. It will also be seen that when the third horse is not pulling the stop prevents the swingletree from being moved forward beyond the desired point, and likewise prevents the forward movement of the doubletree.

As will be noticed the three horse swingle can only swing a short distance toward the double tree without being engaged by the stop F.

I claim:

1. A three-horse swingletree comprising a beam, a swingletree pivotally connected therewith, a double tree pivotally connected with the swingletree and a stop arranged between the swingletree and double tree to limit the forward movement of the double tree when two horses are attached to the double tree and the swingle tree is left free.

2. A three-horse swingletree comprising a beam, a swingletree, a support between the beam and swingletree to which the latter is pivotally connected, a double tree, a link pivotally connecting the swingle and double trees, and a stop located on the beam between the swingletree and double tree whereby forward movement of the latter is limited when two horses are attached to the double tree and the swingletree is left free.

In testimony that I claim the foregoing as my invention, I have signed my name in presence of two subscribing witnesses.

RAGNAR KJUUS.

Witnesses:
  M. E. GULBORMSEN,
  RUTH LINDSTRIM.

Copies of this patent may be obtained for five cents each, by addressing the "Commissioner of Patents, Washington, D. C."